United States Patent [19]
Helms

[11] 3,721,882

[45] March 20, 1973

[54] POSITIONING SYSTEM

[75] Inventor: Clifford J. Helms, Woodland Hills, Calif.

[73] Assignee: Sperry Rand Corporation, New York, N.Y.

[22] Filed: June 25, 1971

[21] Appl. No.: 156,767

[52] U.S. Cl. ..................................318/594, 318/603

[51] Int. Cl. ..................................G05b 11/18

[58] Field of Search.......318/576, 594, 601, 603, 687

[56] References Cited

UNITED STATES PATENTS

| | | | |
|---|---|---|---|
| 3,512,060 | 5/1970 | Floyd | 318/603 |
| 3,105,963 | 10/1963 | Stevens | 318/576 |
| 3,237,486 | 3/1966 | Gilbert | 408/181 |
| 3,323,030 | 5/1967 | Inaba | 318/594 |

*Primary Examiner*—Harold Broome
*Assistant Examiner*—Thomas Langer
*Attorney*—English, Kapustin and Cleaver

[57] ABSTRACT

A system useful in a magnetic disc storage unit for rapidly and accurately positioning a magnetic head over a selected disc track. The system includes a linear motor for driving a carriage structure supporting a head carrying arm assembly. The motor is selectively energized by a control unit in response to new track command information provided thereto. The control unit includes a velocity transducer for yielding carriage velocity information and a displacement transducer for yielding track count information. A counter, responsive to said track count information, at all times stores a count representative of the actual head track position for comparison with the track command information. The difference between the actual head track position and command track position determines the magnitude of velocity command signal introduced into a velocity servo loop for driving the motor. As the difference decreases, the velocity command signal magnitude is reduced to progressively reduce motor velocity. When the difference reaches a predetermined small value (e.g., zero), the velocity command signal is reduced to zero and a position servo loop, responsive to information provided by the displacement transducer, is enabled to bring the carriage to rest in a position at which the error signal provided by the displacement transducer to the position servo loop is nulled.

8 Claims, 2 Drawing Figures

INVENTOR.
CLIFFORD J. HELMS

BY Lindenberg, Freilich & Wasserman

ATTORNEYS

POSITIONING SYSTEM

FIELD OF THE INVENTION

This invention relates to a positioning system useful in magnetic disc storage units for rapidly and accurately positioning a head over a selected disc track.

Many applications require the rapid and precise positioning of a movable element in response to electrical command information. For example only, in large magnetic disc digital storage units, it is common practice to employ movable heads which can be selectively positioned over any one of a plurality of concentric tracks defined on a disc surface. In some such advanced systems, track densities on the order of 150 tracks per radial inch may be encountered. Since it is essential that the head be positioned quite close to the track center line for proper recording and playback, such a track density requires a positioning accuracy to within perhaps 300 microinches. In addition to positioning accuracy, it is essential in magnetic disc applications to be able to rapidly reposition a head from one track to another. For example, in a system employing 2 foot diameter discs with 812 tracks (150 tracks per radial inch) and two heads being provided per disc surface, it may be desirable to achieve track to track access times on the order of 15 milliseconds and full stroke i.e., from track 0 to track 405) access times on the order of 100 milliseconds.

Although the prior art is replete with various positioning system configurations, those that are capable of performing at the speeds and resolutions required for advanced disc systems, usually require the application of some external source to the head in order to rapidly bring it to rest at a precise position.

SUMMARY OF THE INVENTION

In view of the foregoing, it is an object of the present invention to provide an improved positioning system capable of very rapidly and accurately positioning elements, such as magnetic heads.

Briefly, in accordance with the present invention, a positioning system is provided in which a linear motor is connected in a servo loop which can be selectively operated in either a velocity mode or a position mode. The velocity mode is defined by introducing a velocity command signal into the loop as an error signal component. The position mode is defined by disabling the velocity command signal input and instead introducing a cyclic displacement signal as an error signal component.

More particularly, in accordance with the present invention, the servo loop is normally operated in the velocity mode. As the motor carriage is driven toward a defined destination position, its velocity is progressively reduced so that when the carriage passes a position in advance of the destination position by a known distance, the velocity will be at a known rate. At this position, the velocity command signal is reduced to zero and the position servo loop is enabled by introducing said cyclic displacement signal into the loop. The effect is to bring the carriage rapidly to rest with only a very small overshoot at a "detent" position precisely defined by a null in the displacement signal, without requiring the application of any external forcing function to the carriage.

In the preferred embodiment of the invention, the linear motor is energized in accordance with the output of an operational amplifier which is responsive to a set of error signal components including a velocity feedback signal and either a velocity command signal or a cyclic displacement signal. The velocity feedback signal is derived from a tachometer which is responsive to the motor carriage velocity. The velocity command signal is developed by analog circuitry so as to be incrementally proportional to the magnitude difference between the motor carriage actual position and a defined destination position. The actual position is represented by a counter which counts cycles (zero crossings) of a COUNT sine wave produced by a displacement indicating transducer. Thus, the carriage velocity is incrementally reduced as the carriage approaches its destination position. The velocity command signal is normally introduced into the servo loop to define a velocity control mode. As the carriage passes a particular position in advance of the destination position by a known displacement, the velocity command signal input to the servo loop is disabled and instead a POSITION sine wave signal (90° out of phase with the COUNT sine wave) is introduced through the servo loop as an error signal component. This action detents the carriage in a position corresponding to a zero crossing of the POSITION sine wave without requiring the application of any external force.

The novel features of the invention are set forth with particularity in the appended claims. The invention will be best understood from the following description when read in conjunction with the accompanying drawing.

Figures 1, 2:
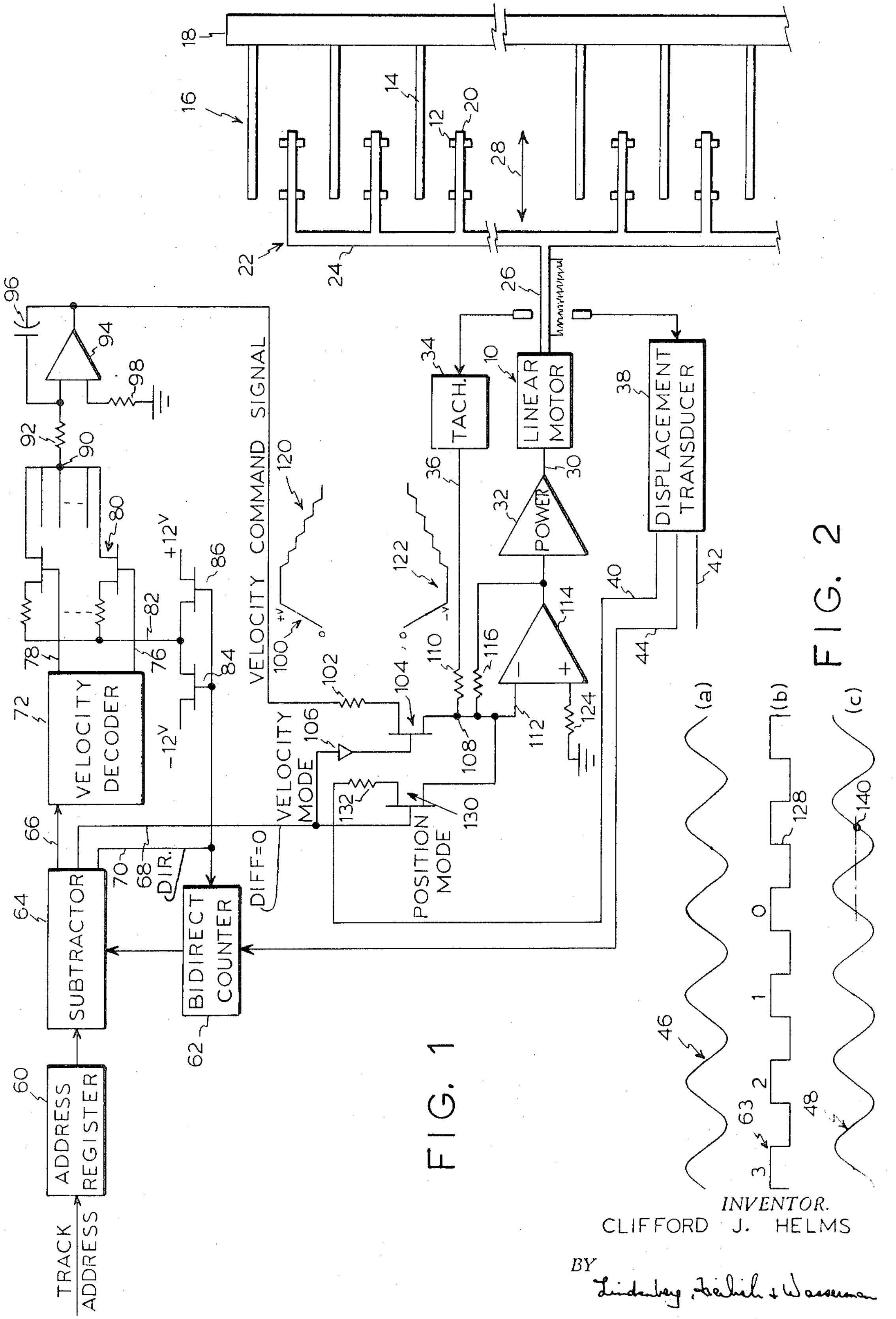
FIG. 1 is a block diagram of a positioning system in accordance with the present invention.
FIG. 2 is a wave form diagram illustrating typical wave forms produced by the displacement transducer of FIG. 1.

Attention is now called to FIG. 1 of the drawing which illustrates a system for controlling the energization of linear motor 10 in order to selectively position heads 12 relative to tracks defined on the surfaces of magnetic discs 14. More particularly, embodiments of the present invention are particularly suitable for use in combination with a magnetic disc storage unit 16 which includes a plurality of discs 14 mounted on a common shaft 18 for rotation therewith. As is well known in the art, the discs 14 are usually coated with magnetic material on both surfaces thereof. Information can be recorded on and read from the magnetic coating by magnetic heads 12.

In a typical magnetic disc storage unit, the discs have a two foot diameter with concentric tracks being defined on the disc surface at a density of 150 per radial inch. The heads 12 are supported on arms 20 forming part of a comb-like assembly 22 having a common back bar 24. The back bar 24 is coupled to a carriage structure 26 of the linear motor 10 so that in response to energization of the motor the back bar 24 can be linearly moved toward and away from the shaft 18 as represented by the arrows 28.

Although the detailed configuration of the motor 10 is not germane to the present invention, for the sake of clarity, it will be assumed herein that the motor 10 is of the type disclosed in U. S. Pat. No. 3,505,544. As is taught therein, linear motion in either a forward or rearward direction can be imparted to a carriage structure by supplying a current to a movable drive coil. The input terminal to the drive coil (not shown) is represented in FIG. 1 by line 30 coupled to the output of a power amplifier 32.

The present invention is directed to a system for controlling the energization of the motor 10 so as to enable the heads 12 to be rapidly and precisely positioned over selected tracks defined on the discs 14. In order to achieve rapid and precise positioning, a system in accordance with the invention derives both velocity and displacement information from the motion of the carriage 26. More particularly, a tachometer 34 is provided for producing a signal on output terminal 36 whose amplitude is proportional to the velocity of the carriage 26. The tachometer 34 may be of the type illustrated in the aforementioned U. S. Pat. No. 3,505,544. Displacement information is derived from the motion of the carriage 26 by a displacement transducer 38. The transducer 38 may be one of several available devices which provides a cyclic signal in response to movement of the carriage 26. More particularly, it is desired that the displacement transducer 38 provide a periodic signal in which each cycle corresponds to an incremental movement of the carriage 26 equal to the distance between adjacent disc tracks. Although different transducers of both the magnetic and optical types are commercially available for performing this task, a particularly suitable optical transducer is sold by Dynamics Research Corp., Stoneham, Mass., Model LMS 106. This particular transducer is provided with three output terminals, 40, 42 and 44. Output terminals 42 and 44 respectively provide a sine wave and a square wave, in phase with one another, as shown in lines (a) and (b), respectively, of FIG. 2. As has been mentioned, each cycle of the sine wave 46 of line (a), which will hereinafter be referred to as the COUNT sine wave, corresponds to the incremental movement of a head 12 from one track to an adjacent track. A POSITION sine wave 48 shown in line (c) is produced on displacement transducer output terminal 40. The position sine wave 48 is identical to, but delayed by 90° with respect to, the COUNT sine wave 46.

As will be seen hereinafter, the output signal provided by the tachometer 34 and displacement transducer 38 are utilized in accordance with the present invention in order to rapidly move the heads 12 and cause them to come to rest substantially over the center line of a selected track without requiring the application of any external force.

In the system of FIG. 1, digitally represented track address command information is loaded into a digital address register 60. This information identifies a destination track to which the heads 12 are to be repositioned. The actual track position of the head is at all times identified by the COUNT stored in a digital bidirectional counter 62. The counter 62 counts cycles of the square wave 63 (FIG. 2, line (b)) provided by the displacement transducer on output terminal 44.

A subtraction circuit 64 is provided for determining the numerical difference between the destination track and the actual track position of the heads 12. The subtraction circuit 64 is provided with three output terminals 66, 68 and 70. Magnitude information is provided on the output terminal 66 which at all times indicates how far the heads must still be moved to reach the destination track defined by the address 60. Direction information is provided on the output terminal 70 indicating whether the heads need to be moved inwardly or outwardly. More particularly, let it be assumed that the outermost track of a disc surface is identified as track 0 and that the track numbers increase progressively toward the shaft 18. Then, if the destination track number stored in the register 60 is greater than the actual track number stored in the counter 62, it of course means that the motor carriage 26 must be driven forwardly to move the heads toward the shaft 18. On the other hand, if the new track number stored in the register 60 is smaller than the track number defined by the counter 62, the motor carriage 26 must be moved rearwardly to withdraw the heads 12 from the shaft 18. The direction information provided by the subtraction circuit 64 on terminal 70 determines the counting direction of the counter 62. That is, the counter 62 will count the cycles of the signal applied thereto in the direction to reduce the magnitude of the difference represented by the subtraction circuit on output terminal 66. Subtraction circuit output terminal 68 is utilized to indicate when the magnitude difference represented on output terminal 66 is equal to zero. The utilization of output terminal 68 will be discussed in greater detail hereinafter.

The magnitude difference represented on subtraction circuit output terminal 66 will at all times indicate the distance that the heads have to be moved in order to reach their destination position. As will be seen, the maximum velocity imparted to the motor carriage 26 depends upon the distance to be moved. Thus, if the heads have to be moved a full stroke, i.e., from track 0 to track 405, the carriage 26 is driven to its maximum linear velocity and then progressively decreased as the heads approach the destination track. On the other hand, if the heads need to be moved only a few tracks, then the carriage velocity is not permitted to reach its maximum speed.

The velocity decoder 72 quantizes the difference represented at output terminal 66 into, for example, ten distinct levels each representing a different range of distances through which the heads must be moved. In its simplest configuration, the decoder 72 will be provided with ten output terminals such that output terminal 76 will be enabled if the heads need to be moved a large distance and output terminal 78 will be enabled if only a very small head movement is required. Each of the eight other velocity decoder output terminals will be enabled for a different range of head movement between these extremes. Each output terminal is connected to the gate of a different transistor 80. The source terminals on each of the transistors 80 are connected through different valued resistors to a common line 82. Line 82 in turn is connected to the drain terminals of transistors 84 and 86. The source terminal of transistor 84 is connected to a minus 12 volt source and the source terminal of transistor 86 is connected to a +12 volt source. The gate terminals of transistors 84 and 86 are controlled by the direction information presented on the output terminal 70 of the subtraction circuit 64. That is, if the heads are to be moved inwardly, for example, transistor 84 will be enabled and if the heads are to be moved outwardly, transistor 86 will be enabled. Thus, either a plus or minus 12 volt signal will be applied to the line 82.

The drain terminals of all the transistors 80 are connected to a common summing junction 90. Thus, in response to a difference represented on subtractor output terminal 66, a current will be produced at summing junction 90 whose polarity is determined by direction information available on terminal 70 and whose amplitude is determined by the magnitude of the difference represented on subtractor output terminal 66.

The current available at the summing junction 90 is coupled through resistor 92 to a first input terminal of operational amplifier 94. A feedback capacitor circuit 96 couples the output of amplifier 94 to the first input terminal thereof. The second input terminal of amplifier 94 is connected through resistor 98 to ground.

As will be appreciated, amplifier 94 will produce a ramp voltage output in response to an input current applied to the first input terminal through resistor 92. The ramp voltage output from amplifier 94 represented by wave form 100 will increase to a value determined by the magnitude of the current produced at summing junction 90.

The output of amplifier 94 is connected through a resistor 102 to the source input terminal of a transistor switch 104. The gate of transistor 104 is controlled by the subtractor circuit output terminal 68 through an inverter 106. That is, if the difference represented on subtractor circuit output terminal 66 is not equal to zero, then output terminal 68 will provide a false logical level which will enable transistor 104. The drain of transistor 104 is connected to the summing junction 108. The tachometer output line 36 is also connected to summing junction 108 through resistor 110. The summing junction 108 is connected to a first input terminal 112 of an operational amplifier 114. The output of the operational amplifier 114 is connected through feed back resistor 116 to the summing junction 108. The second input terminal of amplifier 114 is connected to resistor 124 to ground. The output of the operational amplifier 114 is connected to the input of previously mentioned power amplifier 32 for driving the linear motor 10.

As a consequence of the connections thus far described, the velocity command information provided by the amplifier 94 will be introduced through the enabled transistor 104 into a servo loop including amplifier 114, motor 10 and tachometer 34. This servo loop will function in a velocity control mode to move the motor carriage 26 at the velocity defined by the velocity command information.

In operation, when a new track address is introduced into the register 60, the subtraction circuit 64 will produce a digital difference signal which will result in the production by amplifier 94 of a ramp voltage which will rise to a level dependent upon the distance that the head must be moved to reach the destination track. As the head approaches the destination track, as manifested by the output of bidirectional counter 62, the velocity command signal provided by amplifier 94 will be incrementally stepped down as shown at 120 in the wave form 100. The carriage velocity will be correspondingly reduced as a consequence of the servo loop, and as represented by the tachometer output signal 122 on terminal 36.

As the heads approach the destination track, the counter 62 will be incremented so that the difference represented by subtraction circuit on output terminal 66 will approach zero. The first cycle represented in line (b) of FIG. 2 assumes for example, a difference of three tracks represented on the subtraction circuit output terminal 66 and illustrates how the difference is decremented by one each cycle toward a zero difference. The subtractor circuit 64 will first present a zero difference on output terminal 68 in response to edge 128 of square wave 63 (FIG. 2, line (b) ) when the carriage reaches a position just short of the destination track center line. In accordance with the present invention, in order to precisely position the head relative to the destination track center line without requiring the application of any external forces, the aforementioned servo loop is switched from a velocity control mode to a position control mode when the difference represented by the subtraction circuit 64 reaches zero.

More particularly, a transistor switch 130 is provided whose gate is connected to the subtractor output terminal 68. It has been pointed out that if the subtractor circuit 64 supplies a false level signal on output terminal 68, transistor switch 104 will be enabled. When output terminal 68 goes true, however, transistor switch 104 will be disabled and transistor switch 130 will be enabled. The source terminal of transistor switch 130 is connected through resistor 132 to displacement transducer output terminal 40. The drain of transistor switch 130 is connected to the summing junction 108.

Once the subtractor circuit terminal 68 goes true, displacement transducer output terminal 40 provides the POSITION sine wave 48 as an error signal component to the servo loop including amplifier 114 and motor 10. As a consequence, the motor carriage 26 will move to a precise point at which the error signal attributable to displacement transducer output terminal 40 is nulled. In other words, as a consequence of the servo loop, the carriage 26 will be brought to rest at a detent position corresponding to the zero cross over point 140 on the position sine wave 48.

From the foregoing, it will be recognized that a positioning system has been disclosed herein in which a movable element, such as a magnetic head, can be rapidly and precisely brought to rest, without the application of an external force, by incorporating the linear motor in a servo loop which can be switched from a velocity control mode to a position control mode as the element closely approaches its destination position.

What is claimed is:

1. A system for rapidly and accurately positioning a carriage juxtaposed a desired location on a memory device, said system comprising:

a carriage, drive means connected to the carriage for imparting movement thereto, amplifier means for actuating said drive means, said amplifier means having an input for receiving a plurality of input signals, address register means identifying a desired carriage position, counter means identifying an actual position of said carriage, arithmetic means for producing a plurality of signals indicative of direction and of the difference between the desired carriage position and the actual carriage position, velocity decoder means connected to said arithmetic means for producing a plurality of input signals proportional to the difference between the desired and the actual carriage position, said velocity decoder means being connected through a normally closed switch to said input of said amplifier means, tachometer feedback means coupled to said carriage and providing an input signal at said input of said amplifier means proportional to the velocity of said carriage, displacement transducer means coupled to said carriage and providing a plurality of output signals, at least one output signal being connected to said counter means and another output signal being connected through a normally open switch to said input of said amplifier means and having a voltage change characteristic which coincides with the exact center location of the memory device, and switch means actuated by said arithmetic means when the carriage approaches the desired position, said switch means being connected to open said normally closed switch and to close said normally open switch whereby said drive means is controlled to a final position by an input signal from said tachometer feedback means and an output signal from said displacement transducer.

2. A system for rapidly and accurately positioning a carriage as set forth in claim 1 which further includes direction indicating means connected to said velocity decoder means and said arithmetic means, said direction indicating means being capable of directing said drive means in a plurality of directions.

3. A system for rapidly and accurately positioning a carriage as set forth in claim 2 wherein said tachometer feedback means produces an input signal which is opposite in polarity to the input signal produced by said velocity decoder means.

4. A system for rapidly and accurately positioning a carriage as set forth in claim 3 wherein said tachometer feedback means supplies an input signal which is effective to brake or retard the direction of carriage movement when said switch means opens said normally closed switch.

5. A system for rapidly and accurately positioning a carriage as set forth in claim 1 wherein said voltage change characteristic comprises a slope shape which passes through zero coincident with the exact location of said memory device.

6. A system for rapidly and accurately positioning a carriage as set forth in claim 1 wherein said arithmetic means comprises a subtraction register.

7. A system for rapidly and accurately positioning a carriage as set forth in claim 1 wherein said velocity decoder means comprises an electronic switch coupled to a plurality of transistor circuits each having a dropping resistor in series with a power supply to provide a plurality of voltage levels to the input of said amplifier means.

8. A system for gross and fine positioning a magnetic head supported on a carriage opposite to the exact center of a track on a memory device, comprising means for rapidly positioning a magnetic head to the boundry edge defining a pre-selected track of a memory device, said means including a closed loop servo having a power source connected to a drive motor which is actuated by digital decoding means producing a voltage output proportional to the distance the magnetic head must travel to reach the boundry edge defining said pre-selected track said means further including an address register connected to said digital decoding means, displacement transducer means connected to said carriage and providing first and second signals indicative of the position of said magnetic head, said first signal providing a track count pulse to the digital decoding means, and switch means actuated by said address register for disconnecting said digital decoding means from said closed loop servo and connecting fine positioning means in said servo loop, said fine positioning means being responsive to said second signal which provides an analog voltage slope characteristic having a null or zero voltage output to said drive motor when said magnetic head is at the exact center of said track and having voltage outputs of opposite polarity at opposite sides of the center of said track.

* * * * *